(12) United States Patent
Skourtis et al.

(10) Patent No.: US 11,386,216 B2
(45) Date of Patent: Jul. 12, 2022

(54) VERIFICATION OF PRIVACY IN A SHARED RESOURCE ENVIRONMENT

(71) Applicant: International Business Machines Corporation, Armonk, NY (US)

(72) Inventors: Dimitrios Skourtis, Santa Cruz, CA (US); Nathalie Baracaldo Angel, San Jose, CA (US); Rui Zhang, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 908 days.

(21) Appl. No.: 16/188,367

(22) Filed: Nov. 13, 2018

(65) Prior Publication Data
US 2020/0151351 A1  May 14, 2020

(51) Int. Cl.
*G06F 21/62* (2013.01)
*G06F 9/50* (2006.01)
*G06N 5/04* (2006.01)

(52) U.S. Cl.
CPC ........ *G06F 21/6218* (2013.01); *G06F 9/5005* (2013.01); *G06N 5/04* (2013.01)

(58) Field of Classification Search
CPC ............... G06F 21/6218; G06F 9/5005; G06F 21/6254; G06N 5/04
See application file for complete search history.

(56) References Cited

U.S. PATENT DOCUMENTS

| | | | |
|---|---|---|---|
| 9,355,258 B2 | 5/2016 | Ukil et al. | |
| 9,356,961 B1 | 5/2016 | Todd et al. | |
| 9,547,768 B2 | 1/2017 | Ukil et al. | |
| 9,582,780 B1 | 2/2017 | Curcic et al. | |
| 2010/0024042 A1* | 1/2010 | Motahari | G06Q 10/10 726/26 |
| 2014/0237620 A1 | 8/2014 | Ukil et al. | |
| 2015/0261959 A1 | 9/2015 | Ukil et al. | |
| 2015/0312263 A1 | 10/2015 | Bhamidipati et al. | |
| 2016/0350558 A1* | 12/2016 | Koike | G06F 21/6254 |
| 2017/0103232 A1* | 4/2017 | Scaiano | G06F 21/6254 |

(Continued)

OTHER PUBLICATIONS

J. Tang, Y. Cui, Q. Li, K. Ren, J. Liu, and R. Buyya, "Ensuring security and privacy preservation for cloud data services," ACM Computing Surveys, vol. 49, No. 1, Article 13 (Jun. 2016), 39 pages.

(Continued)

*Primary Examiner* — Farid Homayounmehr
*Assistant Examiner* — Suman Debnath
(74) *Attorney, Agent, or Firm* — Lieberman & Brandsdorfer, LLC

(57) ABSTRACT

Embodiments relate to a system, program product, and method for use with a computer platform to support privacy preservation. The platform measures and verifies data privacy provided by a shared resource service provider. An assessment is utilized to support the privacy preservation with respect to a data steward, and associated shared data. It is understood that data associated with a data service has an expected level of privacy. A privacy score directly correlating to a leakage indicator of the service is formed, and an associated data container is populated with inferred entities deemed to at least meet a preferred privacy level. The privacy score effectively certifies the security of the populated data container.

20 Claims, 10 Drawing Sheets

(56) References Cited

U.S. PATENT DOCUMENTS

2018/0307859 A1* 10/2018 LaFever .................. G16H 10/60
2019/0089711 A1*  3/2019 Faulkner ............. H04L 63/1425
2019/0188421 A1*  6/2019 Meira Pires de Azevedo ............
                                                        G06N 3/08
2019/0347443 A1* 11/2019 Mandal ................. G06F 16/221

OTHER PUBLICATIONS

A. Razaque and S Rizvi, "Privacy preserving model: a new scheme for auditing cloud stakeholders," Journal of Cloud Computing: Advances, Systems and Applications (2017).
D. Agrawal, A. Abbadi, and S. Wang, "Secure and Privacy-Preserving Data Services in the Cloud: A Data Centric View, " Proceedings of the VLDB Endowment, vol. 5, No. 12 (Aug. 27-31, 2012).
L. Gu, S. Cheung, "Constructing and Testing Privacy-Aware Services in a Cloud Computing Environment—Challenges and Opportunities," Proceedings of the 1st Asia-Pacific Symposium on Internetware, Internetware 2009 (Dec. 25, 2009).
Kevin D. Bowers et al., "Proofs of Retrievability: Theory and Implementation," Proceeding of the 2009 ACM Workshop on Cloud Computing Security, pp. 43-54, Nov. 13, 2009.
http://cisconet.com/qos/qos-general/127-easy-qos-101-qos-protocols.html, May 5, 2009.
https://docs.chef.io/platform_overview.html, Apr. 5, 2017.
Salman A. Basel, "Cloud SLAs: Present and Future," SIGOPS Operating Systems Review, pp. 57-66, Jul. 2012.
Cynthia Dwork and Aaron Roth, "The Algorithmic Foundations of Differential Privacy," Foundations and Trends in Theoretical Computer Science, vol. 9, Nos. 3-4, pp. 211-407, 2014.
Frank McSherry and Ilya Mironov, "Differential Private Recommender Systems: Building Privacy Into the Netflix Prize Contenders," Proceedings of the 15th ACM SIGKDD International Conference on Knowledge Discovery and Data Mining (KDD) | Jun. 2009.
Frank McSherry, "Privacy Integrated Queries, An Extensible Platform for Privacy-Preserving Data Analysis" Proceedings of the 2009 ACM SIGMOD International Conference on Management of Data (SIGMOD) | Jun. 2009.
Latanya Sweeney, "k-Anonymity: A Model For Protecting Privacy," International Journal on Uncertainty, Fuzziness and Knowledge-based Systems, 10 (5), 2002; 557-570.
N. Li, T. Li and S. Venkatasubramanian, "t-Closeness: Privacy Beyond k-Anonymity and l-Diversity," IEEE 23rd International Conference on Data Engineering, 2007.
A. Machanavajhala, J. Gehrke, D. Kiferand M. Venkitasubramaniam, "L-diversity: privacy beyond k-anonymity," 22nd International Conference on Data Engineering (ICDE '06), 2006.
Chalmers, Dan, and Morris Sloman. "QoS and context awareness for mobile computing." In Handheld and Ubiquitous Computing, pp. 380-382. Springer Berlin Heidelberg, 1999.

* cited by examiner

VERIFICATION OF PRIVACY IN A SHARED RESOURCE ENVIRONMENT

BACKGROUND

The present embodiments relate to security associated with an application service provider in a shared resource environment. More specifically, the embodiments relate to privacy assessment and privacy preservation as related to the application service provider and associated data.

A data steward is an entity responsible for management and proficiency of stored data to ensure fitness of data elements. An example of a data steward is a hospital collecting information from multiple patients and medical professional, where data collected needs to be protected according to privacy and legislation requirements. More specifically, a data steward is responsible for data processing, data policies, data guidelines and administration of information in compliance with policy and regulatory obligations. A data steward is also known as the data controller in certain legislations such as General Data Protection Regulation (GDPR). Thus, the data steward is an entity responsible for ensuring that security and privacy policies comply with regulatory and governance initiatives to manage privacy and confidentiality of data.

The role and responsibilities of the data steward may include serving as a data custodian, which includes addressing classification of data and associated risk tolerance. The data steward is responsible for provisioning access to data, including reviewing and authorizing data access requests individually or defining a set of rules to determine eligibility for the access. For example, eligibility may be based on a business function, roles, etc. The data steward is an aspect within the information technology platform to ensure privacy and appropriate access of associated data. However, the data steward is one entity in a system of a plurality of entities. It is understood that with the development and growth of information technology and associated infrastructure, such as shared sources, there are locations where security of data and/or associated services may be compromised in a manner that is beyond the control of the data steward.

While privacy legislations such as the Health Insurance Portability and Accountability Act (HIPAA) and GDPR impose obligations on data stewards to protect the privacy of data owners, data stewards also make use of services to maintain data and help provide anonymized queries to private datasets. Because private data can be queried in an anonymized fashion, for example to perform research studies, data stewards need to ensure they detect any potential data leakages and that in case those arise, that they act promptly to stop them.

SUMMARY

The embodiments include a system, computer program product, and method for facilitating auditing of private data through the collection, test, computation of a privacy score based on auxiliary information and specific characteristics of the service used for anonymization and private data, notification processing and delivery.

In one aspect, a system is provided with a computer platform and one or more associated tools for managing privacy, and more specifically for assessment of privacy preservation. A processing unit is operatively coupled to memory and is in communication with a tool in the form of an Auditing and Privacy Verification Evaluator, hereinafter referred to as the Evaluator. The Evaluator functions to receive a preferred level of privacy for a computing resource. In addition, the Evaluator performs a confidence level assessment of candidate inferences, and from this assessment forms a set of inferred entities and selectively assigns individual candidate inferences to an inferred entity set. The Evaluator performs a privacy preservation assessment for the formed set. This assessment returns a privacy score that can be used as a leakage indicator. The Evaluator populates a data container with inferred entities that violate the preferred privacy level.

In another aspect, a computer program device is provided to perform a privacy preservation assessment. The device has program code embodied therewith. The program code is executable by a processing unit to receive a preferred level of privacy for a computing resource. The program code performs a confidence level assessment of candidate inferences, and from this assessment forms a set of inferred entities and selectively assigns individual candidate inferences to an inferred entity set. Program code is also provided to perform a privacy preservation assessment for the formed set. This assessment returns a privacy score directed at a leakage indicator. A data container is provided operatively coupled to the program code and program code device. The program code populates the data container with inferred entities that violate the preferred privacy level.

In yet another aspect, a method is provided for supporting and performing a privacy preservation assessment. A preferred level of privacy for a computing resource is received, and a confidence level assessment of candidate inferences is performed. From this assessment, a set of inferred entities is formed and individual candidate inferences are selectively assigned to an inferred entity set. Thereafter, a privacy preservation assessment is performed for the formed set. This assessment returns a privacy score directed at a leakage indicator. A data container is populated with inferred entities that violate the preferred privacy level.

These and other features and advantages will become apparent from the following detailed description of the presently preferred embodiment(s), taken in conjunction with the accompanying drawings.

BRIEF DESCRIPTION OF THE SEVERAL VIEWS OF THE DRAWINGS

The drawings referenced herein form a part of the specification. Features shown in the drawings are meant as illustrative of only some embodiments, and not of all embodiments, unless otherwise explicitly indicated.

FIG. 1 depicts a system diagram illustrating a distributed computer system, the system entities and their roles.

FIG. 2 depicts a block diagram illustrating a schematic representation of a computer system and associated components for preserving privacy, including conducting a privacy assessment and selectively populating and communicating a data container responsive to the assessment.

FIG. 3 depicts a block diagram illustrating an example of the data container.

FIG. 4 depicts a flow chart illustrating a process for the initial privacy assessment.

FIG. 5 depicts a flow chart illustrating a process for raw data assessment.

FIG. 6 depicts a block diagram illustrating support of parallel privacy test execution.

DETAILED DESCRIPTION

Figure 1:
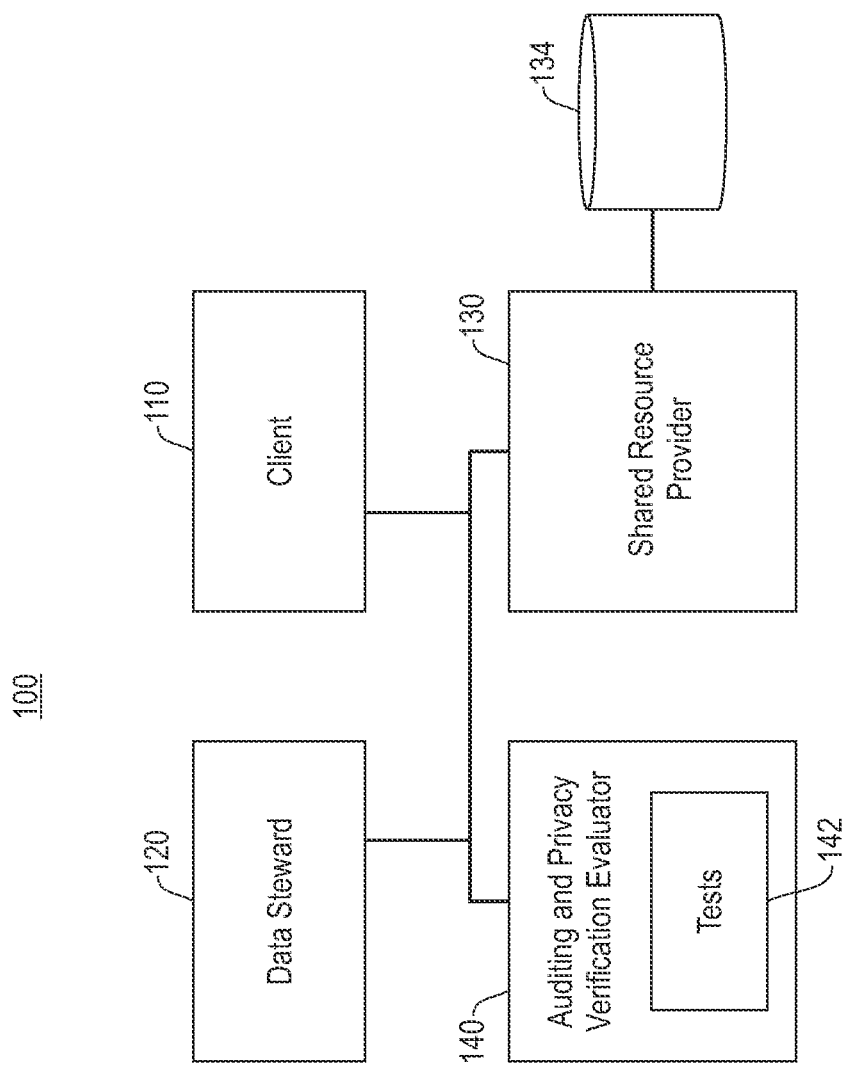

It will be readily understood that the components of the present embodiments, as generally described and illustrated in the Figures herein, may be arranged and designed in a wide variety of different configurations. Thus, the following detailed description of the embodiments of the apparatus, system, method, and computer program product of the present embodiments, as presented in the Figures, is not intended to limit the scope of the embodiments, as claimed, but is merely representative of selected embodiments.

Reference throughout this specification to "a select embodiment," "one embodiment," or "an embodiment" means that a particular feature, structure, or characteristic described in connection with the embodiment is included in at least one embodiment. Thus, appearances of the phrases "a select embodiment," "in one embodiment," or "in an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

A service that is run on a shared computing resource may be available to a plurality of devices across one or more network connections. Such services are referred to as application service providers (ASPs), which provide a computer-based service to customers over a network. As shown, a data steward is a client of a service supported by the ASP. The supported service is referred to herein as a cloud service. The evaluation of the cloud service is supported by a separate service, referred to herein as an Auditing and Privacy Verification Evaluator, hereinafter referred to as the Evaluator. The Evaluator is responsible for checking privacy preservation of the cloud service at any location used by the steward. The Evaluator is responsible for running or executing privacy tests directed at the cloud service. Such tests may be executed on a periodic basis, when a data set is substantially modified, when a privacy method or setting is subject to change, or when a request is received from the data steward. In one embodiment, the Evaluator is also cognizant of the resources and associated strain on the cloud service, and avoids disruption of workloads supported by the cloud service, and/or cloud service supported hardware.

Data privacy, also referred to herein as privacy, is an aspect of information technology that addresses the ability of an organization or individual to disseminate data. A system that protects privacy has as goals to restrict who, how, what and for what purpose an entity can access the information. Measuring privacy is directed at a non-operational and non-functional requirement. Infrastructure is a term employed in information technology that refers to a collection of hardware, software, networks, data centers, and related equipment that support information technology services. As such infrastructures are subject to growth and inter-connection, there is a concern for maintaining data privacy. While hardware and software vulnerabilities may compromise the confidentiality and privacy of data trivially, understanding and detecting the inference risks of private data is also paramount. The latter requires additional effort as inference of information is not necessarily well understood and may depend on how much an adversary may know about the data protected, auxiliary information widely or easily obtainable and the anonymization techniques used to protect the private data.

Referring to FIG. 1, a block diagram (100) of a distributed computer system, the system entities and their roles are provided. As shown, there are four entities, including a client (110), a data steward (120), a shared resource provider (130), and the Evaluator (140). As shown in this overview, the client (110) and the data steward (120) are operatively coupled to the shared service provider (130). In one embodiment, the data steward (120) provides data to the shared resource provider (130), which stores the data, e.g. private data or a mixture of private and public data, on one or more shared storage devices (134). The client (110) has limited access to the data through the shared resource provider (130) for privacy reasons. For example, in one embodiment, the client (110) may submit a query for data to shared storage device (134) via the resource provider (130). Although only one client (110) and one steward (120) are shown in this example, the provider (130) may support multiple stewards and clients, with each steward having an associated privacy standard and each client having an associated permissive level of access to the data in the shared storage device (134). For example, in one embodiment, there may be two clients with each client having a different permissive access level and associated restriction to the data. Similarly, in one embodiment, there may be two or more clients, with at least two of the clients having the same or similar permissive levels and associated restriction to the data.

As further shown, the Evaluator (140) is operatively coupled to the shared resource provider (130). The Evaluator (140) functions to evaluate privacy associated with the service supported and enabled by the provider (130). More specifically, the Evaluator (140) is responsible for assessing if the shared resource provider (130) is properly preserving the privacy of the data at any point of time. The shared resource provider (130) should be performing adequate anonymization controls to ensure that the client(s) (110) is only obtaining anonymized information as per the requirements of the data steward (120). The Evaluator (140) is shown herein configured with a pool of tests (142) designed to infer or anonymize data sets for common privacy preservation. Examples of data privacy preservation include, but are not limited to, k-anonymity, l-diversity, and differential private mechanisms. Each of these example data privacy preservation tools employs techniques to guarantee the privacy of the data subject to assessment by the Evaluator (140). As shown and described below, the Evaluator (140) is responsible for running tests to evaluate the privacy preservation techniques run by the shared resource provider (130). These tests can be conducted on a periodic basis, responsive to modification of an associated data set, responsive to a modification of an associated privacy setting, or responsive to a request received from the data steward. In one embodiment, execution of one or more privacy tests by the Evaluator (140) takes place in a manner that avoids disruption to workloads. The goal of the privacy test execution is to imitate behavior of an adversary that tries to obtain private data and proactively address any identified privacy weakness(es). Accordingly, as shown, the Evaluator (140) functions as an auditor of the service provider (130) to assess privacy services.

Figure 2:
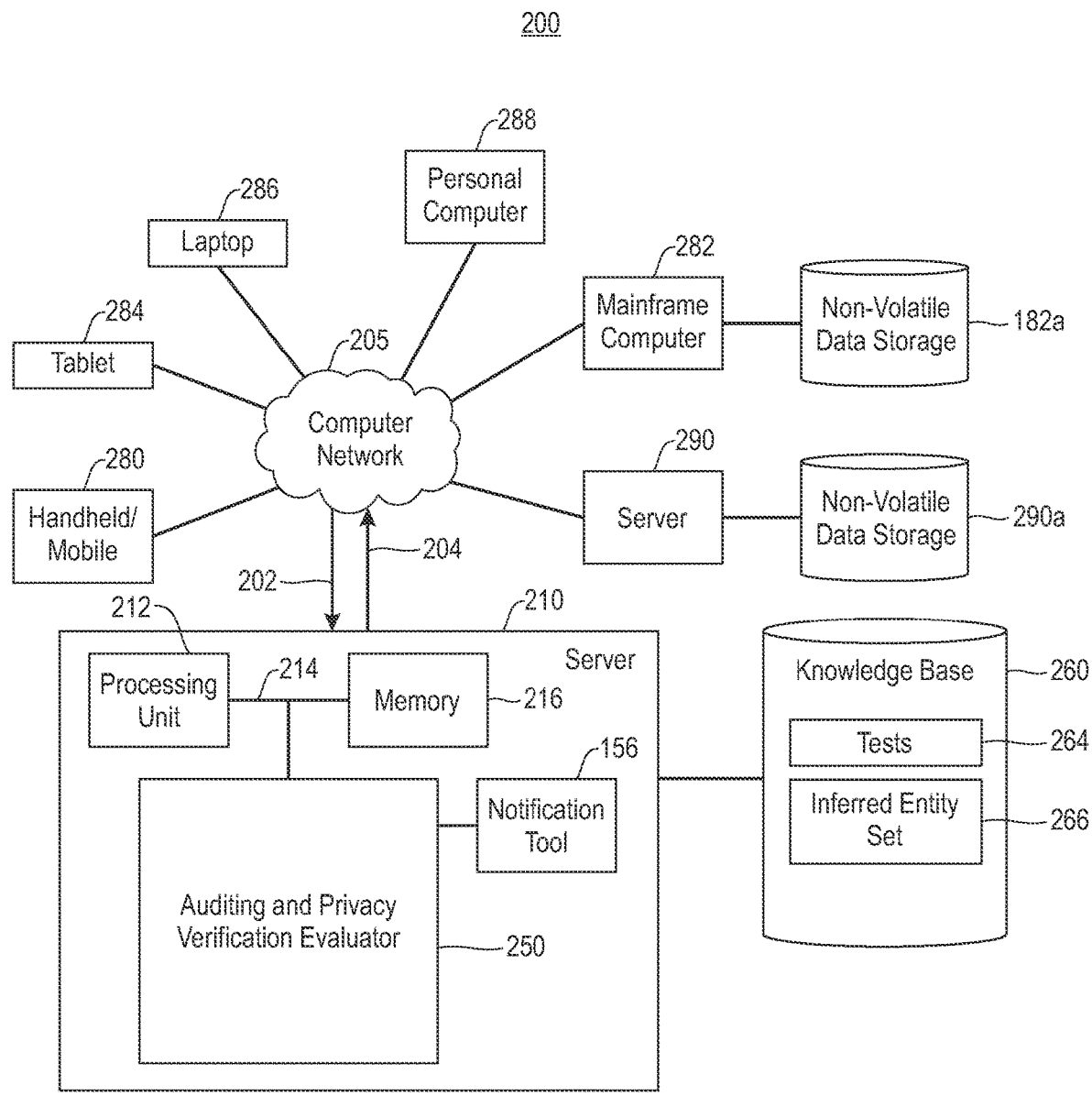

Referring to FIG. 2, a schematic diagram of a computer system and associated components (200) for preserving privacy, including conducting a privacy assessment and selectively populating and communicating a data container responsive to the assessment, is depicted. As shown, a server (210) is provided in communication with a plurality of computing devices (280), (282), (284), (286), and (288) across a network (205) and associated network connections. The server (210) is configured with a processing unit (212) in communication with memory (216) across a bus (214). The server (210) is shown with the Evaluator (250) operatively coupled to the processing unit (212), and configured to support and enable privacy preservation assessment. One or more computing devices (280), (282), (284), (286) and (288) are also shown operatively coupled to the network (205). In one embodiment, one or more of the computing devices (280)-(288) may be locally coupled to the server (210). Similarly, in one embodiment, the server (210) may be a shared remote processing device accessible across the network (205). In another embodiment, one or more of the computing devices (280)-(288) may be a shared remote processing device. The computing devices (280)-(288) communicate with each other and with other devices or components via one or more wired and/or wireless data communication links, where each communication link may comprise one or more of wires, routers, switches, transmitters, receivers, or the like. In this networked arrangement, the server (210) and the network connection (205) may enable notification processing and modeling for one or more content users. Other embodiments of the server (210) may be used with components, systems, sub-systems, and/or devices other than those that are depicted herein.

The Evaluator (250) is configured to communicate with remote shared resources over a communication network. For example, Evaluator (250) may communicate with one or more of the computing devices (280)-(288), and associated data storage. As further shown, the Evaluator (250) is in communication with a shared remote computing device (290), operatively coupled to a data center (290a), also referred to herein as a shared data storage location. The Evaluator (250) is operatively coupled to a knowledge base (260) of one or more tests (264). In select embodiments, the knowledge base (260) also referred to herein as corpus, may include structured, semi-structured, and/or unstructured content that are contained in one or more large knowledge databases or corpus. The various computing devices (280), (282), (284), (286), and (288) shown in communication with the network (205) may include access points for data stewards to provide data and clients to query the data. In one embodiment, the data steward(s) is referred to as the content creators and the client(s) is referred to as the content user(s). The network (205) may include local network connections and remote connections in various embodiments, such that the Evaluator (250) may operate in environments of any size, including local and global, e.g. the Internet.

The Evaluator (250) may serve as a back-end system that can assess privacy preservation from a variety of knowledge extracted from or represented in documents, network accessible sources and/or structured data sources. It is understood that data anonymization is the use of one or more techniques designed to make it impossible or at least difficult, to identify a particular individual from stored data related to them. The purpose of data anonymization is to protect the privacy of the individual and to make it legal for entities such as governments and businesses to share their data, which in one embodiment includes getting permission according to rules and or regulations, such as GDPR and HIPAA. De-anonymization is a reverse engineering process used to detect the sensitive source data. As shown and described, the Evaluator (250) infers private information to assess de-anonymization of a data set. More specifically, the Evaluator (250) functions as an assessor of the quality of data anonymization.

With respect to privacy and associated private data, it is understood that confidentiality of the data is expected and as such is an inherent if not an express characteristic. As shown in FIG. 1, data is associated with three entities, including the client, data steward, and resource provider. The Evaluator (250) functions to receive a preferred level of privacy for service and data associated with a computing resource. In one embodiment, this preferred level of service may be related to the computing resource, also known as the service provider. A derived set of entities (266), also referred to herein as a set of inferred entities, is formed by running tests (264). As shown herein, the tests (264) are stored in the knowledge base (260). As a result of running the tests (264), as shown and described in FIG. 4, a set of inferences and an associated confidence level are returned. In one embodiment, the confidence level is a value that indicates how confident the test was on detecting that inference. For example, if the confidence level is 1, this may be an indication that the test made a correct inference, whereas a confidence level of 0.1 may be an indication that the test may not have made a correct inference. In one embodiment, a threshold is applied to determine how much confidence is needed from a test. The Evaluator (250) selectively assigns individual candidate inferences to an inferred entity set. Each candidate inference that is included in the inferred entity set is based on a confidence level assessment and an associated confidence level. The Evaluator (250) populates a data container with the formed set of inferred entities (266), also referred to as an inferred entity set, that violate the confidence level to dictate the entity set should be reported. The function of the Evaluator (250) is to identify candidate inferences that have been inappropriately anonymized, and as such represent a risk of de-anonymization. Accordingly, the inferred entity set is a collection of candidate entities that are initially considered to have been properly anonymized.

The Evaluator (250) functions to assess the quality and level of privacy of the entities that comprise the initial inferred set that has been identified and compiled. More specifically, the Evaluator performs a privacy preservation assessment for the formed set of inferred entities. The privacy assessment conducted herein is directed at the preferred level of privacy as directed by the steward and a load in the associated service provider. In one embodiment, the steward has an expected level of privacy with the data being supported and managed by the service provider, and the privacy assessment is a third party review to determine if the expectation of the steward is being met by the service provider. The assessment returns a leakage indicator in the form of a privacy score related to privacy information associated with the service. As indicated the Evaluator (250) is in receipt of the preferred level of privacy of service associated with the data. The privacy assessment determines if the preferred level of privacy for the services as related to the inferred set has been attained.

Figure 3:
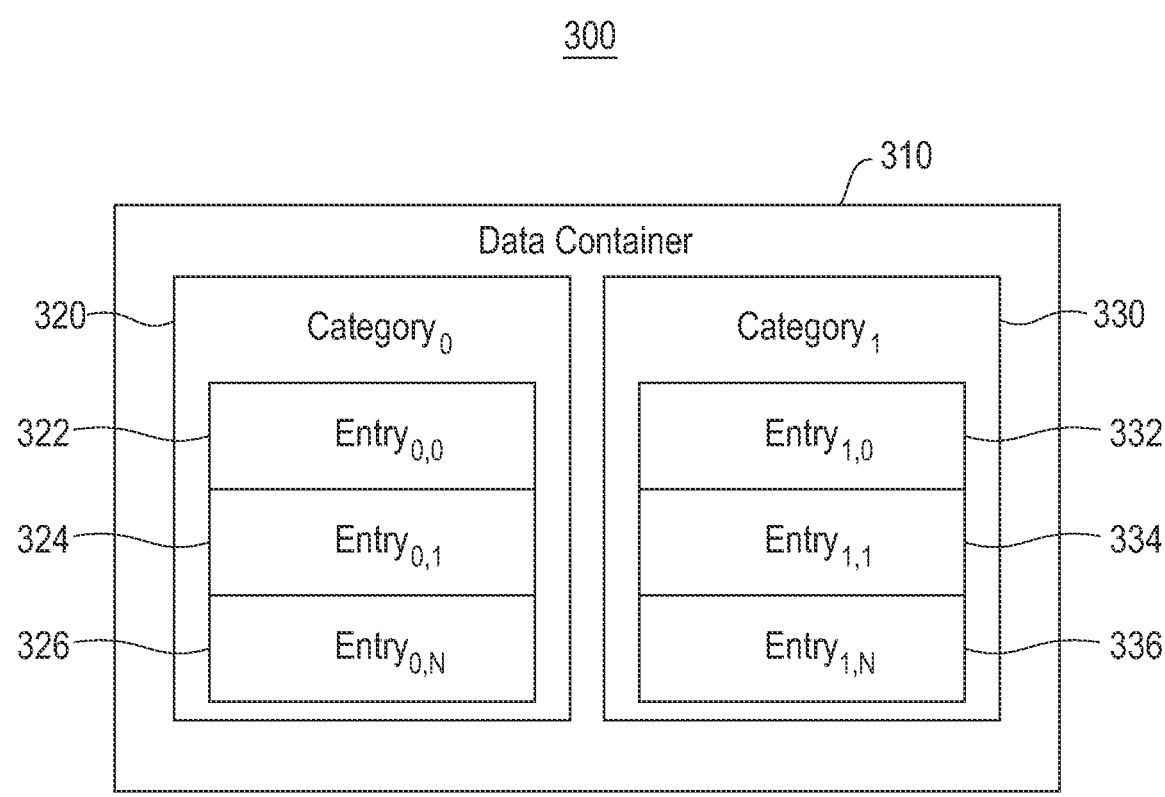

It is understood that the performed assessment is based on inferences, and that further assessment directed at raw data may produce different results, which may affect the population of the data container. Referring to FIG. 3, a block diagram (300) is provided illustrating an example of the data container. As such herein, the data container (310) is in the form of a data structure populated with a category, category$_0$, of raw data (320) and a corresponding category, category$_1$, of candidate inferences (330). Each of the categories is shown herein with entries. More specifically, category$_0$ (320) is shown with entry$_{0,0}$ (322), entry$_{0,1}$, (324) . . . entry$_{0,N}$ (326). Similarly, category$_1$ (330) is shown with entry$_{1,0}$ (332), entry$_{1,1}$, (334) . . . entry$_{1,N}$ (336). In one embodiment, the data container can be any form, including a binary file or other sort of file. In another embodiment, the container's information may be organized differently. In yet another embodiment, it can also be included in a docker container or similar type of software defined environment. Accordingly, the data container is shown herein as a data structure populated with the formed set of entities subject to a confident level assessment.

It is understood that the privacy preservation assessment conducted by the Evaluator (250) is an initial privacy assessment based on an initial set of inferred data. After the initial container population, the Evaluator (250) is employed to conduct a further assessment directed by a comparison of the inferred entities to the raw data, and from this further assessment, the Evaluator (250) creates an adjusted set of inferences. In one embodiment, the further assessment is conducted local to the data steward. The formed adjusted set of inferences may include removal of one or more entries from the inferred entity set (266). More specifically, the initial population of the inferred entity set (266) is based on predictions, and the adjustment of the population of the data container is based on a raw data assessment and includes selective removal of one or more failed predictions. In one embodiment, the Evaluator (250) selectively removes one or more entries from the formed set of inferred entities (266) at any time that the associated data may be considered public data. This selective removal may take place prior to or after receipt of the privacy assessment by the Evaluator (250). The Evaluator (250) may dynamically re-compute the privacy preservation assessment for the adjusted set of inferred entities. In addition, following the re-computation of the privacy preservation assessment, the Evaluator (250) iteratively evaluates the candidate inferences based on the updated or changed privacy score to create a modified set of candidate inferences. In one embodiment, the modified set includes a change of one or more of the candidate inference entries shown in FIG. 3.

The privacy assessment is shown herein conducted by the Evaluator (250). The Evaluator (250) may conduct the assessment based on a data set, a privacy method modification, or an explicit request from a cloud service steward. Accordingly, the communications and functionality of the Evaluator (250) allows the data steward to upload sensitive data sets, and to perform privacy preserving queries on the data sets.

Figure 4:
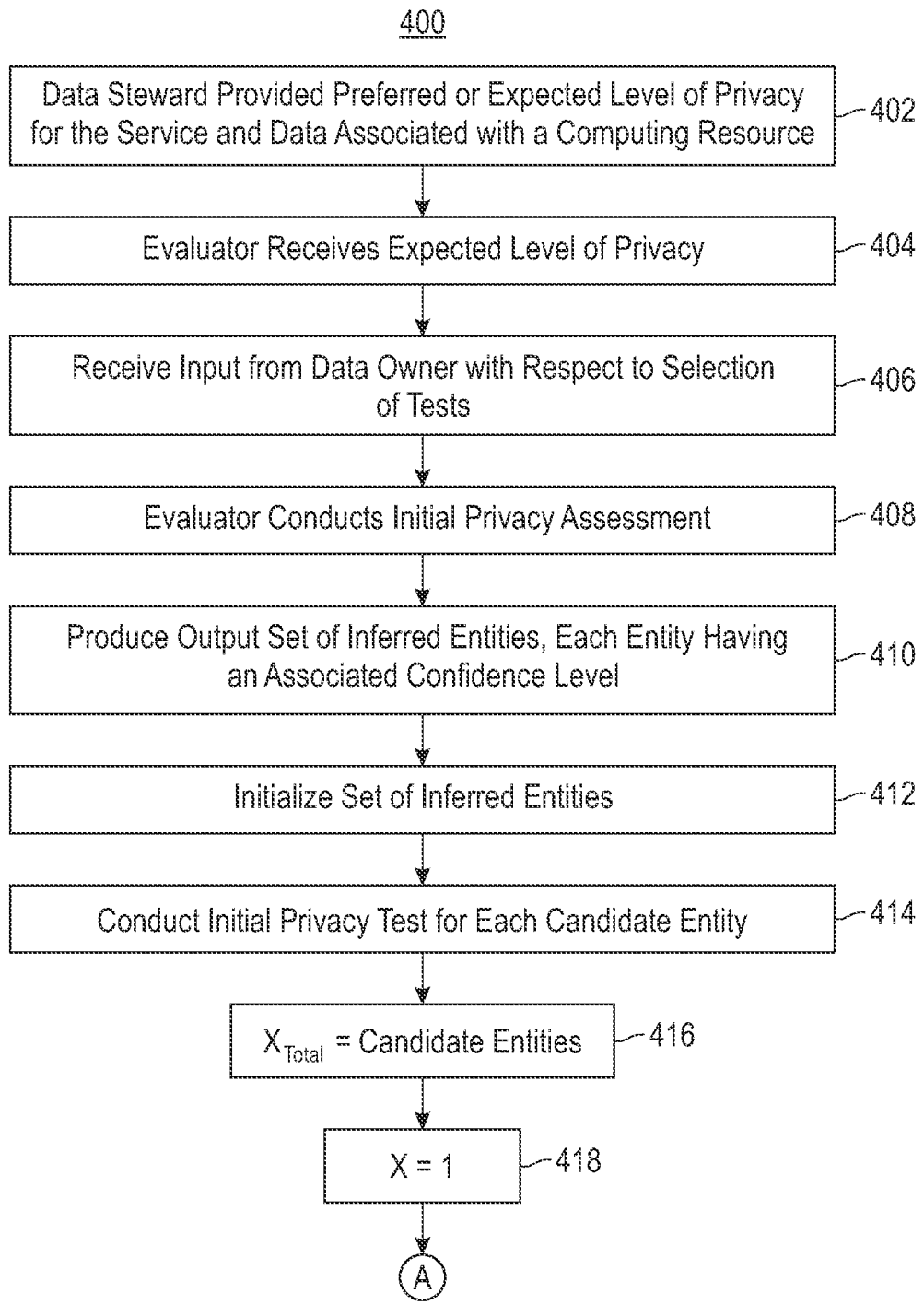
Figure 4:
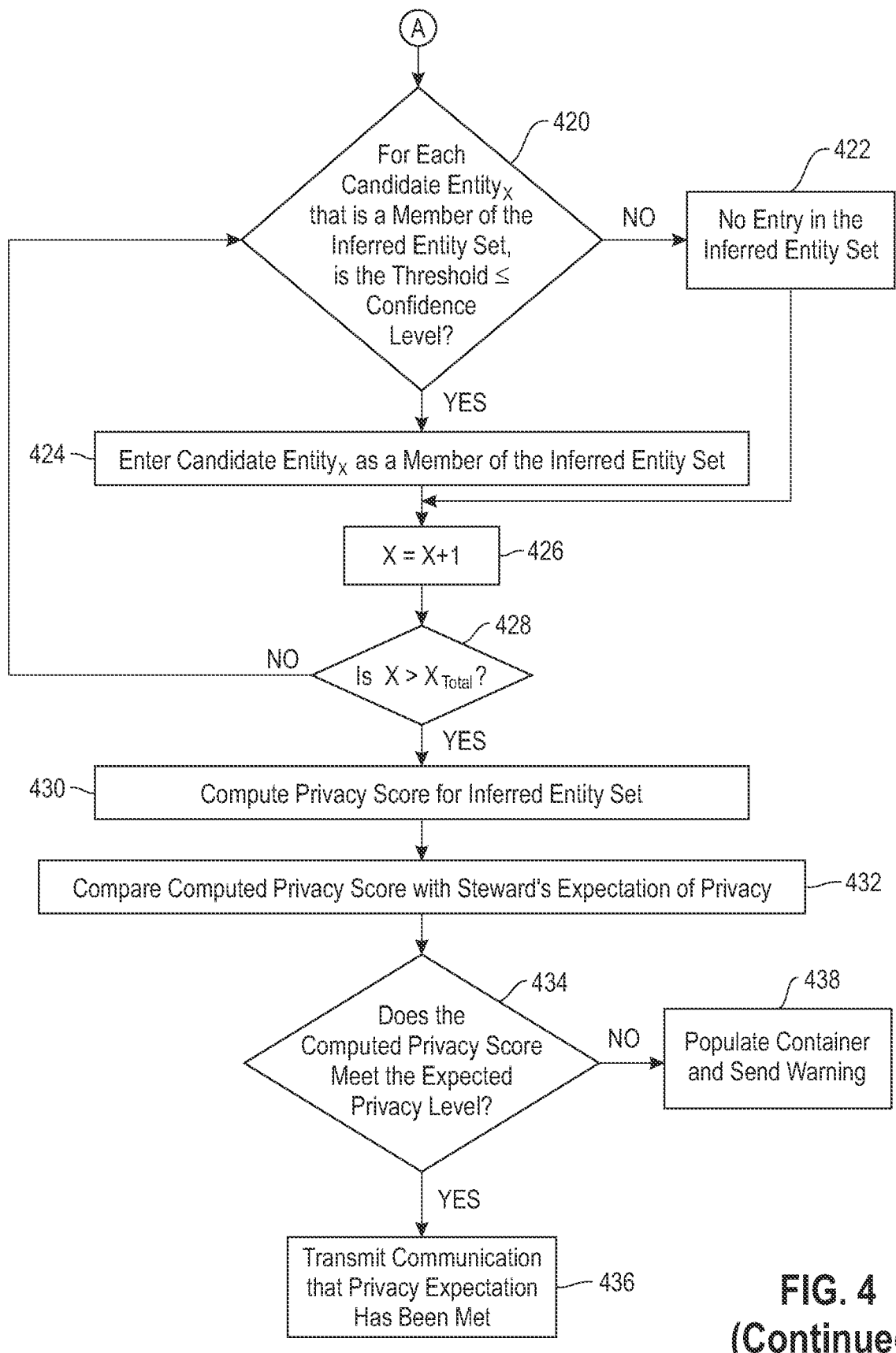

Referring to FIG. 4, a flow chart (400) is provided illustrating a process for the initial privacy assessment. As shown, the data steward provides a preferred or expected level of privacy for the service and data associated with a computing resource (402). The privacy level may be identified at such time as the steward registers or subscribes to the service, or in one embodiment, the privacy level may be identified at a later point in time. The Evaluator (140), as shown in FIG. 1, is configured with a pool of tests (142) designed to infer or de-anonymize data sets for common privacy preservation. Each of these example data privacy preservation tools employs techniques to guarantee the privacy of the data subject to assessment by the Evaluator. The function of the Evaluator (140) is to imitate the profile of a hacker. There are different evaluations that may be employed by the Evaluator (140). In one embodiment, the Evaluator (140) may receive one or more identifiers or quasi-identifier directed at an associated data set. Similarly, in one embodiment, the evaluation may be related to the types of data associated with the cloud service, such as geographic location data, venue data, social network traces, etc. Regardless of the evaluation, the data set associated cloud service subject to evaluation is de-anonymized so that private information is inferred.

The Evaluator (140) receives the expected level of privacy (404). In one embodiment, the data steward identifies a preferred level of privacy for the associated cloud or remote service. Input is obtained from the data owner with respect to selection of tests (406). The input may include identification of sensitive data, e.g. identifiers, potential quasi-identifier, and types of data stored, e.g. images, location information. It is understood that different data types may require different tests. In one embodiment, if this information is not initially provided, a test or query will probe the system to identify the data types. In addition, potential background information is solicited, such as social networks, databases, etc. The thoroughness of the evaluation may also be solicited at step (406) as input, with the thoroughness including but not limited to amount of time to spend in the probing process, a load on a corresponding service provider, and size of data to be crawled. Accordingly, the input solicited at step (406) will dictate the inferred and associated security evaluation.

Following step (406), the Evaluator conducts an initial privacy assessment with the quality and level of privacy of the entities that comprises an initially compiled set of initial inferred entities (408). An output set, T, of inferred entities is produced, with each entity having an associated confidence level (410). A privacy score is computed for the associated service being evaluated for privacy, as shown and described below. The tool performing the assessment has a threshold, T, that determines when a candidate inference is considered an inferred entity, e.g. a high enough confidence level. A set of inferred entities, Set, is initialized (412). An initial privacy test is conducted and produces an associated test result for each inferred entity (414). The variable $X_{Total}$ is assigned to the quantity of candidate entities (416), and an associated counting variable is initialized (418). Each initial privacy test result is assessed with respect to a threshold, $\tau$ (420). More specifically, at step (420), for each candidate entity that is a member of the inferred entity set, it is determined if the threshold, $\tau$, is less than or equal to the respective confidence level. A positive response to the determination at step (420) is followed by entry of the candidate entity, e.g. candidate entity$_X$, as a member in the inferred entity set, Set, (424). Otherwise, the candidate entry, e.g. candidate entity$_X$, is not entered into the Set (422). Following either step (422) or step (424), the candidate entity counting variable is incremented (426), and it is determined if all of the candidate entities have been processed (428) with respect to the privacy test result and associated threshold at step (420). A negative response to the determination at step (428) is followed by a return to step (420) for continued assessment. Following the evaluation of the candidate entities, as demonstrated by a positive response to the determination at step (428), a privacy score is computed for the entity set, Set, (430). In one embodiment, the privacy score is as follows:

1−|Set|/Total entries, where Set is the number of unique inferred entries found by the evaluation, and Total entries is the number of entries in the dataset, e.g. number of rows. Following step (430) the computed privacy score is compared with the steward's expectation of privacy (432). As demonstrated, it is determined if the computed privacy score meets the expected privacy level (434). If the comparison meets the expected privacy level as demonstrated by a positive response to the determination conducted at step (434), a communication is transmitted that the privacy expectation has been met (436). In one embodiment, the communication at step (436) is a report, and may include logs or other types of data supporting the lack of violations of privacy expectations. Conversely, if at step (434) it is determined that the comparison does not meet the expected level of privacy, the data container is populated and a warning is communicated that the privacy expectation or possible security assessment has been violated or not met (438). Accordingly, as shown herein an initial inference entry set is created and evaluated to assess expectation of a service provider, together with formation of a container of the inferred entry set at least meeting the initial assessment protocol(s).

Figure 5:
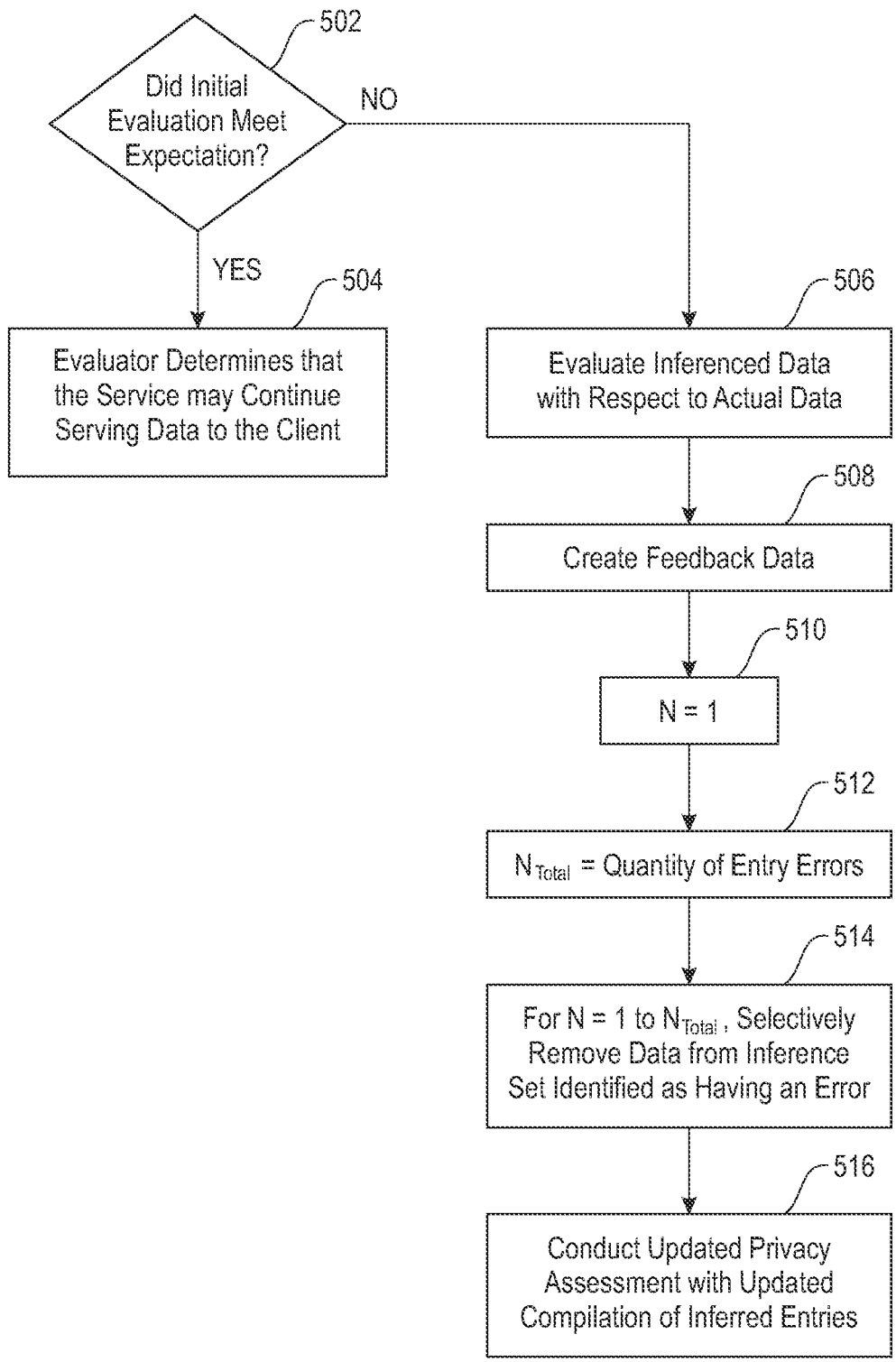

The evaluation shown and described in FIG. 4 is an initial evaluation, and that raw data assessment may be selectively warranted following the initial assessment. It is understood that predictions in the initial assessment may be in error, or that there may be a violation of an associated privacy requirement. Referring to FIG. 5, a flow chart (500) is provided illustrating a process for raw data assessment. As shown, in one embodiment, it is initially determined if the initial evaluation meets the expectations, e.g. is the privacy level expectation met, (502). As shown herein, a positive response to the determination is the Evaluator determining that the service may continue serving data to the client (504). It is understood that a positive response at step (502) is following by a decision by the data steward on how to proceed. However, a negative response to the determination is followed by an evaluation of the inferenced data with raw data, e.g. actual data, (506). In one embodiment, the evaluation at step (506) might take place regardless of the response to the determination at step (502) to ensure that the positive response at step (502) was not provided incorrectly. In one embodiment, an executable is employed to compare the inference entries to raw data, step (506). Feedback data is created from the evaluation (508). More specifically, the feedback data identifies any errors in the inference entry. An error inference entry variable, N is initialized (510), and the variable $N_{Total}$ is assigned to the quantity of entry errors (512). For each error entry from N to $N_{Total}$, the associated entries are removed from the set of candidate inference entries (514) thereby selectively removing data from the inference set. In one embodiment, the removal at step (514) is limited to removing wrong predictions from the inference set. Following step (514), the process conducts an updated privacy assessment with an updated compilation of inferred entries (516). Accordingly, the container is updated to carry only validated inferences.

It is understood that any adjustment of the inference set in FIG. 4 may be communicated to the Evaluator for a future privacy assessment based on inferences. In one embodiment, the Evaluator may dynamically execute the privacy evaluation shown in FIG. 4 based on the adjusted inference set. It is similarly understood that data privacy is not static, and data that is classified or considered private may in the future have some or all of its privacy restrictions lifted. Such lifting of privacy may be explicit, or in one embodiment implicit. For example, an implicit privacy lift may be the product of a press release. Regardless of the form or format of the privacy lift, the data owner may iteratively evaluate the effect of the corresponding revealed data by a return to FIG. 4 for executing the privacy evaluation with a new set of inferred candidate entries based on the actual or proposed security lift.

The assessments shown and described in FIGS. 4 and 5 demonstrate sequential processing of inferences, and selective processing with respect to raw data. It is understood that parallel execution may be used so that tests can scan a large amount of data. For example, a validation of the associated service may be conducted with respect to a service level agreement that identifies off peak or slower usage times of the service or service provider. Similarly, the evaluation is not subject to a single test. In one embodiment, different tests can be executed in parallel, e.g. concurrently, on different processing nodes or different data set nodes. Accordingly, different tests can be run concurrently on different nodes, and different data sets can be tested concurrently by the same test.

Figure 6:
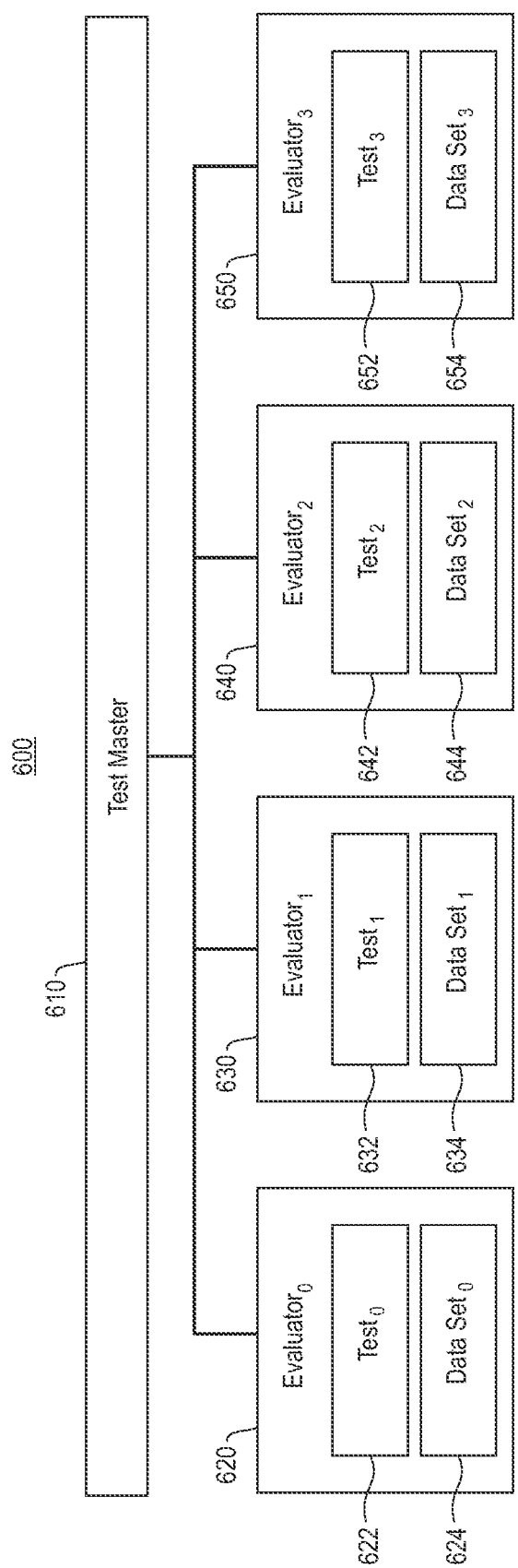

Referring to FIG. 6, a block diagram (600) is provided to demonstrate support of parallel privacy test execution. As shown a test master (610) is in communication with multiple test evaluators, also referred to herein as test workers, (620), (630), (640), and (650). Each test Evaluator is assigned a privacy evaluation test and a data set subject to the evaluation, as shown and described in FIGS. 1-5. More specifically, $evaluator_0$ (620) is assigned $test_0$ (622) and data $set_0$ (624), $evaluator_1$ (630) is assigned $test_1$ (622) and data $set_1$ (634), $evaluator_2$ (640) is assigned $test_2$ (642) and data $set_2$ (644), and $evaluator_3$ (650) is assigned is $test_3$ (652) and data $set_3$ (654). As shown, the same tests may be applied to different data sets. Different data subsets can be tested concurrently by the same test or different test. Accordingly, regardless of the test and data set assignments, it is understood and shown herein that multiple tests, whether the same test or different tests, may be conducted in parallel, e.g. concurrently.

As shown and described in FIG. 4, the data steward may or may not have confidence in the evaluation and the privacy of the data as provided by the associated service provider. The confidence in the assessment enables the data to be queried by a client. Similarly, the evaluation may result in a lack of confidence and require further evaluation and re-assessment of the inferred entries. The testing shown and described herein is conducted in an automated fashion to preserve privacy with respect to remote service providers, e.g. cloud services and their data, to ensure privacy and protection of data. Failure to meet the confidence level assessment is automatically communicated to the data steward to mitigate data breaches. In one embodiment, a data owner, e.g. steward, may iteratively evaluate the effect of revealing additional information which could result in undesirable inferences. Based on an updated privacy score associated with the projected information reveal, the data steward can selectively decide whether to reveal the additional information. Accordingly, the privacy evaluation may be conducted at various times, responsive to various conducts, such as data reveal definition changes, with the evaluation resulting in maintenance of data privacy and privacy expectations of a service provider.

The data steward is responsible for uploading data to a shared service provider and marking or otherwise identifying the data as private or confidential. Due to the intrinsic and sensitive characteristics of the data, one or more clients are selectively allowed to perform privacy preserving queries on the uploaded data. The evaluation shown and described in FIGS. 1-6 is directed at guaranteeing the privacy of the data as set by the steward by auditing data and associated privacy of the data.

The testing and evaluation is responsive to characteristics of the subject data and the selected tests. It is understood that different data may have different levels of privacy or privacy expectations. Similarly, it is understood that such privacy characteristics may not be static or uniform. For example, in one embodiment, different clients may have different levels of access with respect to the data and the privacy settings. The privacy evaluation may return a score that may or may not commensurate with different privacy settings for different clients, resulting in re-assessment, raw data assessment, compilation and communication of an associated data container, etc.

The security evaluation shown and described in FIGS. 1-6 may be implemented as a cloud-based resource. With references to FIG. 7, a block diagram (700) is provided illustrating an example of a computer system/server (702), hereinafter referred to as a host (702) in communication with a cloud-based support system, to implement the processes described above with respect to FIGS. 1-6. Host (702) is operational with numerous other general purpose or special purpose computing system environments or configurations. Examples of well-known computing systems, environments, and/or configurations that may be suitable for use with host (702) include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems, devices, and their equivalents.

Host (702) may be described in the general context of computer system-executable instructions, such as program modules, being executed by a computer system. Generally, program modules may include routines, programs, objects, components, logic, data structures, and so on that perform particular tasks or implement particular abstract data types. Host (702) may be practiced in distributed cloud computing environments where tasks are performed by remote processing devices that are linked through a communications network. In a distributed cloud computing environment, program modules may be located in both local and remote computer system storage media including memory storage devices.

Figure 7:
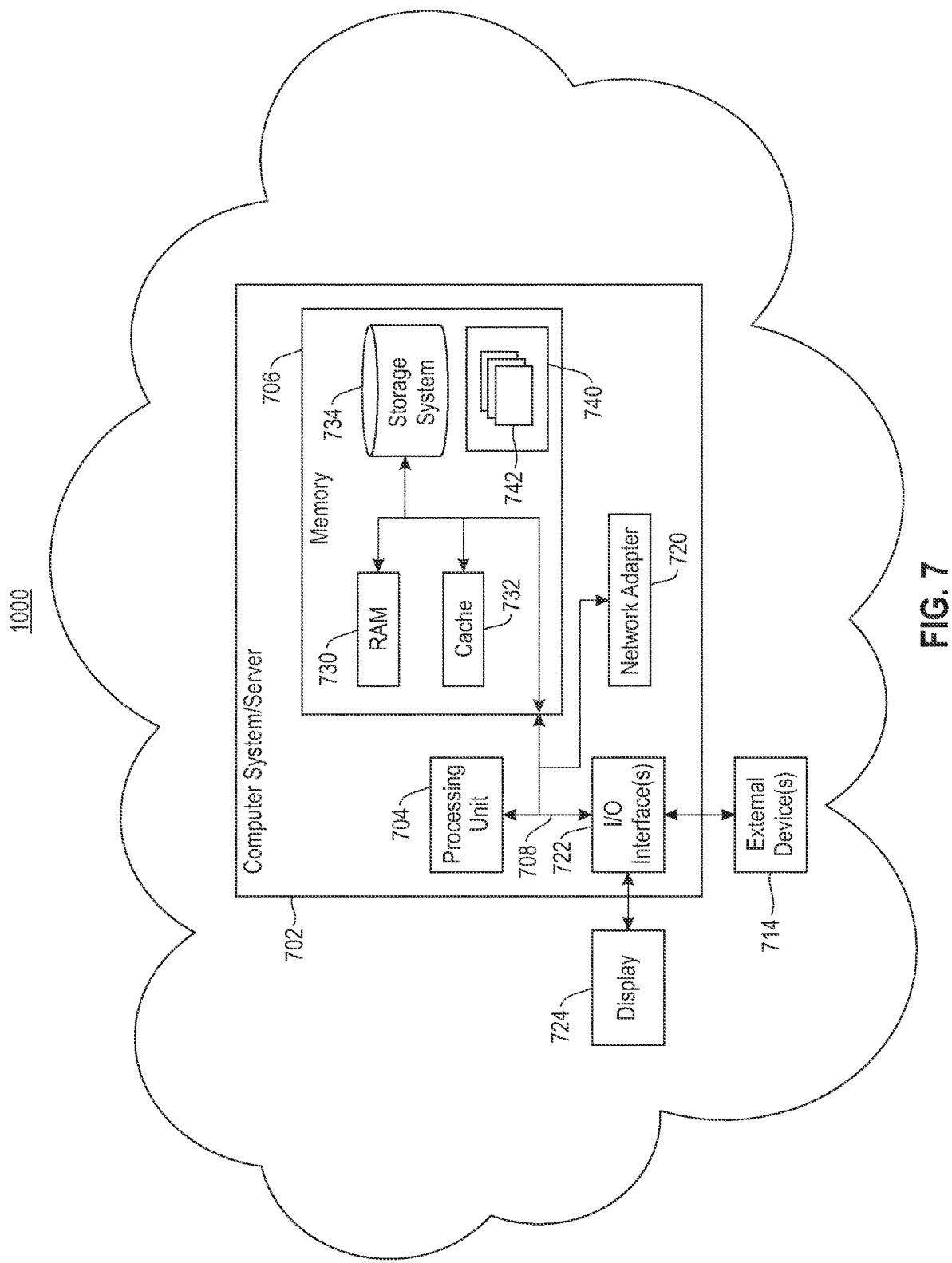
FIG. 7 depicts a block diagram illustrating an example of a computer system/server of a cloud-based support system, to implement the process described above with respect to FIGS. 1-6.

As shown in FIG. 7, host (702) is shown in the form of a general-purpose computing device. The components of host (702) may include, but are not limited to, one or more processors or processing units (704), a system memory (706), and a bus (708) that couples various system components including system memory (706) to processor (704). Bus (708) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Host (702) typically includes a variety of computer system readable media. Such media may be any available media that is accessible by host (702) and it includes both volatile and non-volatile media, removable and non-removable media.

Memory (706) can include computer system readable media in the form of volatile memory, such as random access memory (RAM) (730) and/or cache memory (732). By way of example only, storage system (734) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (708) by one or more data media interfaces.

Program/utility (740), having a set (at least one) of program modules (742), may be stored in memory (706) by way of example, and not limitation, as well as an operating system, one or more application programs, other program modules, and program data. Each of the operating systems, one or more application programs, other program modules, and program data or some combination thereof, may include an implementation of a networking environment. Program modules (742) generally carry out the functions and/or methodologies of embodiments to security classification and evaluation and output directed at container compilation. For example, the set of program modules (742) may be configured as the Auditing and Privacy Verification Evaluator as described in FIG. 1.

Host (702) may also communicate with one or more external devices (714), such as a keyboard, a pointing device, a sensory input device, a sensory output device, etc.; a visual display (724); one or more devices that enable a user to interact with host (702); and/or any devices (e.g., network card, modem, etc.) that enable host (702) to communicate with one or more other computing devices. Such communication can occur via Input/Output (I/O) interface(s) (722). Still yet, host (702) can communicate with one or more networks such as a local area network (LAN), a general wide area network (WAN), and/or a public network (e.g., the Internet) via network adapter (720). As depicted, network adapter (720) communicates with the other components of host (702) via bus (708). In one embodiment, a plurality of nodes of a distributed file system (not shown) is in communication with the host (702) via the I/O interface (722) or via the network adapter (720). It should be understood that although not shown, other hardware and/or software components could be used in conjunction with host (702). Examples, include, but are not limited to: microcode, device drivers, redundant processing units, external disk drive arrays, RAID systems, tape drives, and data archival storage systems, etc.

In this document, the terms "computer program medium," "computer usable medium," and "computer readable medium" are used to generally refer to media such as main memory (706), including RAM (730), cache (732), and storage system (734), such as a removable storage drive and a hard disk installed in a hard disk drive.

Computer programs (also called computer control logic) are stored in memory (706). Computer programs may also be received via a communication interface, such as network adapter (720). Such computer programs, when run, enable the computer system to perform the features of the present embodiments as discussed herein. In particular, the computer programs, when run, enable the processing unit (704)

to perform the features of the computer system. Accordingly, such computer programs represent controllers of the computer system.

In one embodiment, host (702) is a node of a cloud computing environment. As is known in the art, cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Example of such characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher layer of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some layer of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 8:
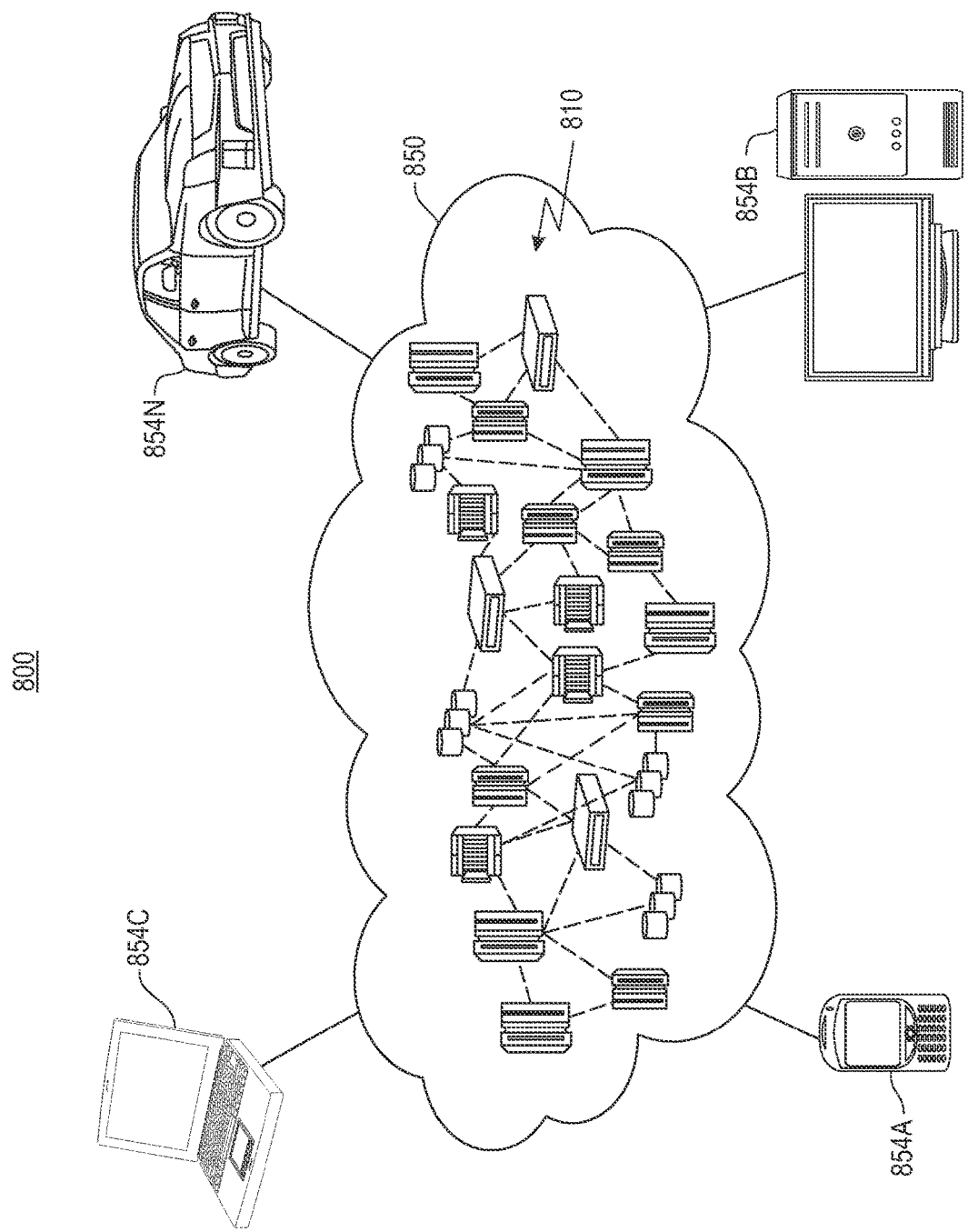
FIG. 8 depicts a block diagram illustrating a cloud computer environment.

Referring now to FIG. 8, an illustrative cloud computing network (800). As shown, cloud computing network (800) includes a cloud computing environment (850) having one or more cloud computing nodes (810) with which local computing devices used by cloud consumers may communicate. Examples of these local computing devices include, but are not limited to, personal digital assistant (PDA) or cellular telephone (854A), desktop computer (854B), laptop computer (854C), and/or automobile computer system (854N). Individual nodes within nodes (810) may further communicate with one another. They may be grouped (not shown) physically or virtually, in one or more networks, such as Private, Community, Public, or Hybrid clouds as described hereinabove, or a combination thereof. This allows cloud computing environment (800) to offer infrastructure, platforms and/or software as services for which a cloud consumer does not need to maintain resources on a local computing device. It is understood that the types of computing devices (855A-N) shown in FIG. 8 are intended to be illustrative only and that the cloud computing environment (850) can communicate with any type of computerized device over any type of network and/or network addressable connection (e.g., using a web browser).

Figure 9:
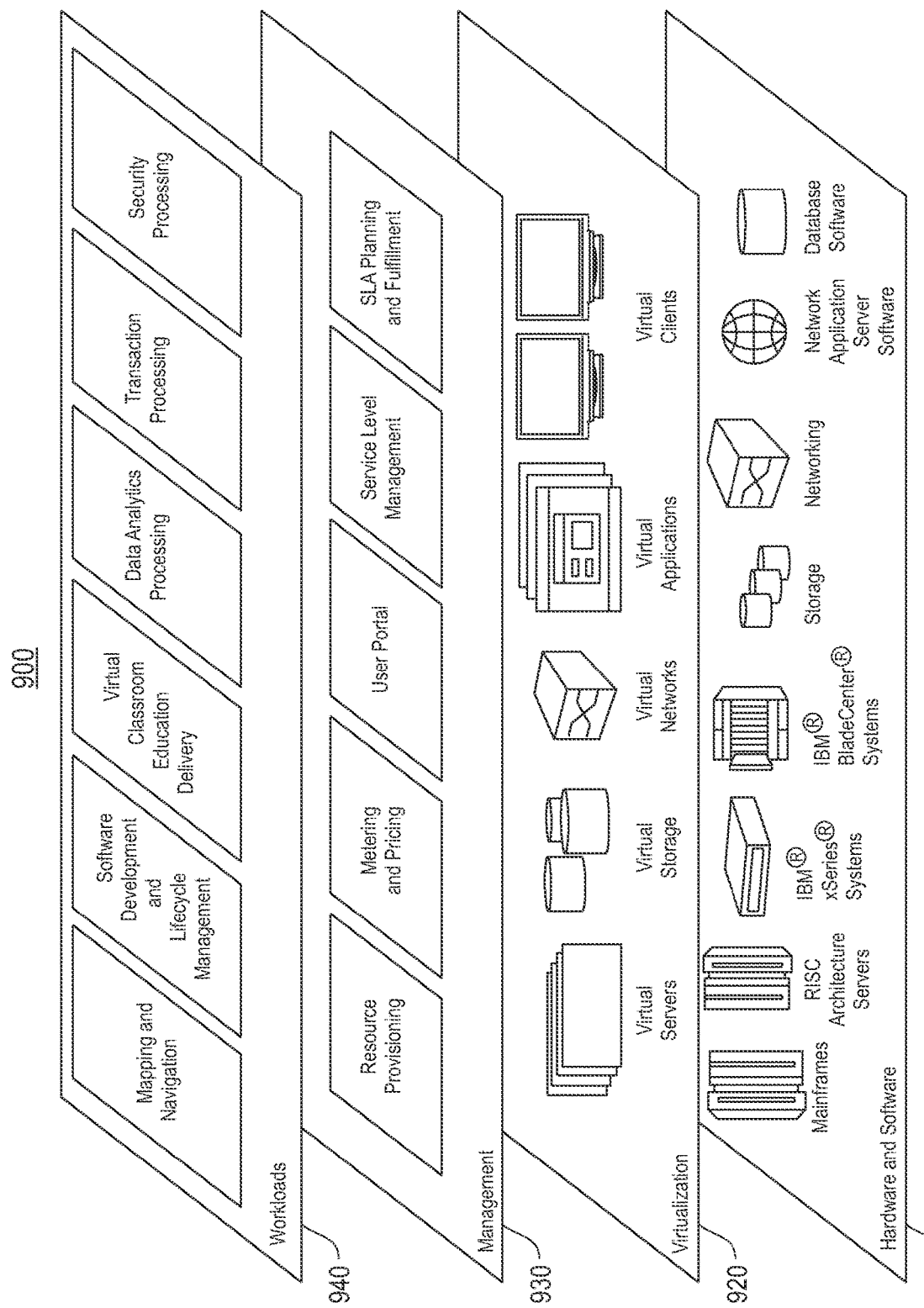
FIG. 9 depicts a block diagram illustrating a set of functional abstraction model layers provided by the cloud computing environment.

Referring now to FIG. 9, a set of functional abstraction layers (900) provided by the cloud computing network of FIG. 7 is shown. It should be understood in advance that the components, layers, and functions shown in FIG. 9 are intended to be illustrative only, and the embodiments are not limited thereto. As depicted, the following layers and corresponding functions are provided: hardware and software layer (910), virtualization layer (920), management layer (930), and workload layer (940). The hardware and software layer (910) includes hardware and software components. Examples of hardware components include mainframes, in one example IBM® zSeries® systems; RISC (Reduced Instruction Set Computer) architecture based servers, in one example IBM pSeries® systems; IBM xSeries® systems;

IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer (920) provides an abstraction layer from which the following examples of virtual entities may be provided: virtual servers; virtual storage; virtual networks, including virtual private networks; virtual applications and operating systems; and virtual clients.

In one example, management layer (930) may provide the following functions: resource provisioning, metering and pricing, user portal, service layer management, and SLA planning and fulfillment. Resource provisioning provides dynamic procurement of computing resources and other resources that are utilized to perform tasks within the cloud computing environment. Metering and pricing provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service layer management provides cloud computing resource allocation and management such that required service layers are met. Service Layer Agreement (SLA) planning and fulfillment provides pre-arrangement for, and procurement of, cloud computing resources for which a future requirement is anticipated in accordance with an SLA.

Workloads layer (940) provides examples of functionality for which the cloud computing environment may be utilized. Examples of workloads and functions which may be provided from this layer include, but are not limited to: mapping and navigation; software development and lifecycle management; virtual classroom education delivery; data analytics processing; transaction processing; and security processing.

It will be appreciated that there is disclosed herein a system, method, apparatus, and computer program product for evaluating and processing data and associated data security protocols and ascertaining an inferred set of entities that may a preferred level of privacy. While particular embodiments of the present embodiments have been shown and described, it will be obvious to those skilled in the art that, based upon the teachings herein, changes and modifications may be made without departing from these embodiments and their broader aspects. Therefore, the appended claims are to encompass within their scope all such changes and modifications as are within the true spirit and scope of the embodiments. Furthermore, it is to be understood that the embodiments are solely defined by the appended claims. It will be understood by those with skill in the art that if a specific number of an introduced claim element is intended, such intent will be explicitly recited in the claim, and in the absence of such recitations no such limitation is present. For non-limiting examples, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to embodiments containing only one such element, even when the same claim includes the introductory phrases "one or more" or "at least one" and indefinite articles such as "a" or "an"; the same holds true for the use in the claims of definite articles.

The present embodiments may be a system, a method, and/or a computer program product. In addition, selected aspects of the present embodiments may take the form of an entirely hardware embodiment, an entirely software embodiment (including firmware, resident software, micro-code, etc.) or an embodiment combining software and/or hardware aspects that may all generally be referred to herein as a "circuit," "module" or "system." Furthermore, aspects of the present embodiments may take the form of computer program product embodied in a computer readable storage medium (or media) having computer readable program instructions thereon for causing a processor to carry out aspects of the present embodiments. Thus embodied, the disclosed system, a method, and/or a computer program product are operative to improve the functionality and operation of notification processing and delivery.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to the embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The Evaluator shown and described herein may run multiple tests that try to de-anonymize the data based on Homogeneity attacks, which exploit potentially small domain of confidential fields; Background attacks which combine other sources of information with the private dataset, location injection attacks where the Evaluator may add entries to geo spatial data service when location data is considered to be private, or a combination of the above attack methods, or more. Additionally, tests could include data queries, statistical analysis, machine learning analytics, SQL and NoSQL queries, among others. In one embodiment, the tests run by the Evaluator may be tailored to the particular anonymization techniques followed by the Share Resourced Provider. Examples of anonymization techniques include but are not limited to k-anonymity, l-diversity, and t-closeness. K-anonymity splits a table into groups, such that each group has at least k records with the same quasi-identifiers (non-sensitive data). Similar to k-anonymity, l-diversity also utilizes a table, but the l-diversity ensures l distinct values in the sensitive column for each group. T-closeness is also similar to k-anonymity, but ensures distribution of the sensitive columns of each group is t-close to that of the table.

In another embodiment, the tests run by the Evaluator may be tailored to the specific data stored by the Share Resource Provider. For example, for geo-spatial information background information on landmarks and percentage of population is included to help tests de-anonymize data sets. Furthermore, some of the tests run may try to query the Share Resource provider with fabricated information to try to produce privacy leakages.

The following use case is an example for assessing a privacy score where a Share Resource Provider is utilizing k-anonymity to protect privacy as represented in Table 1.

TABLE 1

|   | Zip Code | Age | Disease |
|---|----------|-----|---------|
| 1 | 476**    | 2*  | Heart Disease |
| 2 | 476**    | 2*  | Heart Disease |
| 3 | 476**    | 2*  | Heart Disease |
| 4 | 4790*    | ≥40 | Flu |
| 5 | 4790*    | ≥40 | Heart Disease |
| 6 | 4790*    | ≥40 | Cancer |
| 7 | 476**    | 3*  | Heart Disease |
| 8 | 476**    | 3*  | Cancer |
| 9 | 476**    | 3*  | Cancer |

Using the data from Table 1 provided by the Share Resource Provider and using as auxiliary information the fact that it is well known that a set of individuals' data are in Table 1, as well as their zip code or that they are in their twenties, the test can easily infer that they have heart disease. This follows because only people in their twenties are present on the first group of the table. If this is the only test run, then: the test infers entries 1-3 with confidence level for each equal to 1, and the tester can then compute the privacy score as: 1−3/9=1−0.33≈0.66.

The following use case is an example for assessing a privacy score utilizing a test tailored for 1-diversity where the data provided by the Shared Resource Provider is represented in Table 2.

TABLE 2

|   | Zip Code | Age  | Disease       |
|---|----------|------|---------------|
| 1 | 476**    | 2*   | Heart Disease |
| 2 | 476**    | 2*   | Heart Disease |
| 3 | 476**    | 2*   | Flu           |
| 4 | 4790*    | ≥40  | Flu           |
| 5 | 4790*    | ≥40  | Heart Disease |
| 6 | 4790*    | ≥40  | Cancer        |
| 7 | 476**    | 3*   | Heart Disease |
| 8 | 476**    | 3*   | Cancer        |
| 9 | 476**    | 3*   | Cancer        |

A test using the data from Table 2, and as auxiliary information the fact that someone is part of the data and their zip code and their age, we can infer their disease if they are present on the first group of the table and we can infer with certain probability if they are present on the third group. Further using as auxiliary information the fact that one such a person is unlikely to have heart disease, the test can further infer that they have cancer with high probability. If this is the only test run, then: the test infers entries 7-9 with confidence level for each equal to 0.9, and assuming the tester has a threshold of 0.9, the privacy score as: $1-3/9=1-0.33 \approx 0.66$.

The following is a use case where multiple tests are combined to find a privacy score. In this example, the output from a first test, $Test_1$, infers entries 1-3 with a confidence level for each entry being 1, and the output from a second test, $Test_2$, infers entries 1-3 with a confidence level for each entry being 1, infers entries 7-8 with a confidence level for each entry being 0.9, and infers entry 9 with a confidence level of the entry being 0.8. Assuming the tester has a threshold of 0.9, the privacy score computed by the Evaluator is as follows: $1-|\{1,2,3,7,8\}|/9=1-0.55 \approx 0.44$.

It will be appreciated that, although specific embodiments have been described herein for purposes of illustration, various modifications may be made without departing from the spirit and scope of the embodiments. In particular, the privacy assessment certifies privacy provided by a shared resource service provider. The data steward may own the Evaluator, or in one embodiment, the Evaluator is a third-party service. The data steward may fully trust the Evaluator with all private data, hence it may provide ground truth data to the Evaluator to perform the verification of inferences presented in FIG. 5. In another embodiment, the data steward may not trust the Evaluator with private data. In this case, the Evaluator populates a data container with all inferences to the data steward for the data steward to evaluate which inferences are correct and which are not correct. In another embodiment, the Evaluator is part of a shared resource service. With respect to auxiliary information, the Evaluator can maintain the auxiliary information in a database, it can crawl data coming from social network, newspapers, and other sources, or it can receive this information from the data steward. Auxiliary information may include structured, semi-structured, and/or unstructured content that are contained in one or more large knowledge databases or corpus. Accordingly, the scope of protection of these embodiments is limited only by the following claims and their equivalents.

What is claimed is:

1. A system comprising:
   a processing unit operatively coupled to memory;
   a data container; and
   an auditing and privacy verification evaluator in communication with the processing unit and operatively coupled to the data container, the evaluator configured to automatically perform a privacy preservation assessment, the assessment including de-anonymization of an associated dataset and inferring private information informative as to an identity of an individual associated with the dataset, the evaluator configured to:
   receive a preferred level of privacy for service and data associated with a computing resource;
   individually subject a plurality of individual candidate inferences to a confidence level assessment to assess, for each of the individual candidate inferences, a confidence level associated with the individual candidate inference;
   form a set of inferred entities, including selectively assign or not assign each of the individual candidate inferences to the set of inferred entities responsive to the confidence level associated with the individual candidate inference;
   perform the privacy preservation assessment for the formed set of inferred entities, including the performed assessment to return a privacy score for the formed set, the score being a leakage indicator of private information associated with the service; and
   populate the data container with the formed set of inferred entities violating the preferred privacy level.

2. The system of claim 1, wherein the data container includes raw data corresponding to the formed set of inferred entities and the one or more candidate inferences, and wherein the evaluator is further configured to compare the set of inferred entities to the raw data, and create an adjusted set of inferences.

3. The system of claim 2, wherein the evaluator is further configured to adjust the set of inferred entities, including remove a failed prediction from the formed set of inferred entities.

4. The system of claim 3, wherein the evaluator is further configured to re-compute the privacy score based on the adjusted set of inferred entities, including return an updated privacy score corresponding to the adjusted set of inferred entities.

5. The system of claim 4, wherein the evaluator is further configured to iteratively evaluate the candidate inferences based on the updated privacy score, and create a modified set of candidate inferences subject to the evaluation.

6. The method of claim 1, wherein the evaluator is further configured to periodically perform the privacy preservation assessment responsive to a substantive modification of an element selected from the group consisting of: a dataset, a privacy method change, and an explicit request from a cloud service steward.

7. The system of claim 1, wherein the evaluator is further configured to selectively add an entity to the formed set of inferred entities, the selective addition directed at external data and occurring prior to receipt of the privacy score.

8. The system of claim 1, wherein the assessment utilizes more than one test, and wherein the evaluator is further configured to select one or more of the tests responsive to a characteristic of the associated dataset.

9. A computer program product comprising:
   a computer readable storage medium having program code executable by a processor to automatically perform a privacy preservation assessment against a shared pool of configurable computing resources and associated data, the assessment including de-anonymization of an associated dataset and inferring private information informative as to an identity of an individual associated with the dataset, the program code executable by the processor to:

receive a preferred level of privacy for service and data associated with a computing resource;

individually subject a plurality of individual candidate inferences to a confidence level assessment to assess, for each of the individual candidate inferences, a confidence level associated with the individual candidate inference;

form a set of inferred entities, including selectively assign or not assign each of the individual candidate inferences to the set of inferred entities responsive to the confidence level associated with the individual candidate inference;

perform the privacy preservation assessment for the formed set of inferred entities, including the performed assessment to return a privacy score for the formed set, the score being a leakage indicator of private information associated with the service; and selectively populate a data container with the formed set of inferred entities violating the preferred privacy level.

10. The computer program product of claim 9, wherein the data container includes raw data corresponding to the formed set of inferred entities and the one or more candidate inferences, and further comprising program code executable by the processor to compare the set of inferred entities to the raw data, and create an adjusted set of inferences.

11. The computer program product of claim 10, further comprising program code executable by the processor to adjust the set of inferred entities, including remove a failed prediction from the formed set of inferred entities.

12. The computer program product of claim 11, further comprising program code executable by the processor to re-compute the privacy score based on the adjusted set of inferred entities, including return an updated privacy score corresponding to the adjusted set of inferred entities.

13. The computer program product of claim 11, further comprising program code executable by the processor to iteratively evaluate the candidate inferences based on the updated privacy score, and create a modified set of candidate inferences subject to the evaluation.

14. The computer program product of claim 9, further comprising program code executable by the processor to periodically perform the privacy preservation assessment responsive to a substantive modification of an element selected from the group consisting of: a dataset, a privacy method change, and an explicit request from a cloud service steward.

15. The computer program product of claim 9, further comprising program code executable by the processor to selectively add an entity from the formed set of inferred entities, the selective addition directed at external data and occurring prior to receipt of the privacy score.

16. A computer-implemented method comprising:

automatically performing a privacy preservation assessment against a shared pool of configurable computing resources and associated data, the assessment including de-anonymizing an associated dataset and inferring private information informative as to an identity of an individual associated with the dataset, including:

receiving a preferred level of privacy for service and data associated with computing resources;

individually subjecting a plurality of individual candidate inferences to a confidence level assessment to assess, for each of the individual candidate inferences, a confidence level associated with the individual candidate inference;

forming a set of inferred entities, including selectively assigning or not assigning each of the individual candidate inferences to the set of inferred entities responsive to the confidence level associated with the individual candidate inference; and performing the privacy preservation assessment for the formed set of inferred entities, including returning a privacy score for the formed set, the score being a leakage indicator of private information associated with the service; and selectively populating a data container with the formed set of inferred entities responsive to the returned privacy violating the privacy expectation level.

17. The computer-implemented method of claim 16, wherein the data container includes raw data corresponding to the formed set of inferred entities and the one or more candidate inferences, and further comprising comparing the set of inferred entities to the raw data, and creating an adjusted set of inferences.

18. The computer-implemented method of claim 17, further comprising adjusting the set of inferred entities, including removing a failed prediction from the formed set of inferred entities.

19. The computer-implemented method of claim 18, further comprising re-computing the privacy score based on the adjusted set of inferred entities, including returning an updated privacy score corresponding to the adjusted set of inferred entities.

20. The computer-implemented method of claim 18, further comprising iteratively evaluating the candidate inferences based on the updated privacy score, and creating a modified set of candidate inferences subject to the evaluation.

* * * * *